United States Patent
Lavoie et al.

(10) Patent No.: US 10,407,970 B2
(45) Date of Patent: Sep. 10, 2019

(54) INITIATION OF VEHICLE LIFTGATE ACTUATION

(71) Applicant: Ford Global Technologies, LLC, Dearborn, MI (US)

(72) Inventors: Erick Michael Lavoie, Dearborn, MI (US); William McRoy, Ann Arbor, MI (US); Eric L. Reed, Livonia, MI (US); John Robert Van Wiemeersch, Novi, MI (US); Adil Nizam Siddiqui, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 15/664,299

(22) Filed: Jul. 31, 2017

(65) Prior Publication Data
US 2019/0032391 A1    Jan. 31, 2019

(51) Int. Cl.
| | | |
|---|---|---|
| *E05F 15/00* | (2015.01) | |
| *E05F 15/76* | (2015.01) | |
| *B60R 25/01* | (2013.01) | |
| *B60R 25/20* | (2013.01) | |
| *B60R 25/24* | (2013.01) | |

(Continued)

(52) U.S. Cl.
CPC ............ *E05F 15/76* (2015.01); *B60D 1/62* (2013.01); *B60R 25/01* (2013.01); *B60R 25/2054* (2013.01); *B60R 25/241* (2013.01); *H04N 7/188* (2013.01); *H04Q 9/00* (2013.01); *B60D 1/06* (2013.01); *B60J 5/101* (2013.01); *E05F 2015/767* (2015.01); *E05Y 2900/546* (2013.01); *H04Q 2209/82* (2013.01); *H04W 4/80* (2018.02)

(58) Field of Classification Search
CPC ...... E05F 15/76; E05F 2015/767; B60D 1/62; B60D 1/06; B60R 25/2054; B60R 25/01; B60R 25/241; H04N 7/188; B60J 5/101; H04W 4/80; H04Q 2209/82; H04Q 9/00; E05Y 2900/546
USPC .......................................................... 49/31
See application file for complete search history.

(56) References Cited

U.S. PATENT DOCUMENTS

| | | | | |
|---|---|---|---|---|
| 9,587,417 B2* | 3/2017 | Van Gastel | ............ | E05B 81/78 |
| 9,725,942 B2* | 8/2017 | Gunreben | ............... | E05F 15/77 |
| 9,920,564 B2* | 3/2018 | Ebert | ....................... | E05F 15/73 |
| 2013/0234828 A1* | 9/2013 | Holzberg | ............ | B60R 25/2054 |
| | | | | 340/5.72 |

(Continued)

FOREIGN PATENT DOCUMENTS

| | | |
|---|---|---|
| JP | 2008050845 A | 3/2008 |
| JP | 2017506756 A | 3/2017 |

(Continued)

OTHER PUBLICATIONS

Eric Moody, *2013 Ford Escape With Hands-Free Lift Gate*, Connecting Hitchsource.com, Jul. 9, 2013 (4 pages).

*Primary Examiner* — Basil S Katcheves
(74) *Attorney, Agent, or Firm* — Frank Lollo; Neal, Gerber & Eisenberg LLP; James P. Muraff (57) ABSTRACT

Methods and apparatus are disclosed for initiation of vehicle liftgate actuation. An example vehicle includes a liftgate, a proximity sensor for monitoring an activation area of the liftgate, a camera to capture an image of the activation area upon the proximity sensor detecting an object within the activation area, and a liftgate controller. The liftgate controller is to determine, based on the image, whether the object is a leg of a user and actuate the liftgate responsive to determining that the object is the leg.

20 Claims, 7 Drawing Sheets

(51) Int. Cl.
*H04N 7/18* (2006.01)
*H04Q 9/00* (2006.01)
*B60D 1/62* (2006.01)
*E05F 15/73* (2015.01)
*H04W 4/80* (2018.01)
*B60D 1/06* (2006.01)
*B60J 5/10* (2006.01)

(56) References Cited

U.S. PATENT DOCUMENTS

| | | | | |
|---|---|---|---|---|
| 2014/0070920 | A1* | 3/2014 | Elie | H03K 17/945 |
| | | | | 340/5.72 |
| 2014/0303849 | A1* | 10/2014 | Hafner | B62D 13/06 |
| | | | | 701/42 |
| 2015/0247352 | A1* | 9/2015 | Adams | E05F 15/73 |
| | | | | 701/2 |
| 2016/0039456 | A1* | 2/2016 | Lavoie | B62D 15/027 |
| | | | | 701/41 |
| 2016/0265263 | A1* | 9/2016 | Motoki | E05F 15/73 |
| 2016/0281410 | A1 | 9/2016 | Schanz et al. | |
| 2017/0001598 | A1* | 1/2017 | Pophale | B60R 25/24 |
| 2017/0009509 | A1* | 1/2017 | Ryu | B60W 50/08 |
| 2017/0152697 | A1* | 6/2017 | Dehelean | B60R 25/2054 |
| 2018/0363357 | A1* | 12/2018 | Polewarczyk | E05F 15/73 |

FOREIGN PATENT DOCUMENTS

| | | |
|---|---|---|
| KR | 100887688 B1 | 3/2009 |
| KR | 20150030789 A | 3/2015 |
| WO | WO 2016158364 A1 | 10/2016 |

* cited by examiner

INITIATION OF VEHICLE LIFTGATE ACTUATION

TECHNICAL FIELD

The present disclosure generally relates to vehicle liftgates and, more specifically, to initiation of vehicle liftgate actuation.

BACKGROUND

Typically, vehicles include doors and/or panels to enable users (e.g., occupants) to access interior areas of the vehicles. Oftentimes, a vehicle include side doors (e.g., a driver door, a front passenger seat, a rear driver-side door, a rear passenger-side door) to enable a driver and/or passenger(s) to enter and/or exit from a vehicle cabin. In some instances, a vehicle includes a liftgate that enable user(s) to access a trunk and/or other cargo area of the vehicle. Recently, some vehicles include hands-free liftgate systems that enable a user to initiate opening and/or closing of a liftgate without use of his or her hands.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for initiation of vehicle liftgate actuation. An example disclosed vehicle includes a liftgate, a proximity sensor for monitoring an activation area of the liftgate, a camera to capture an image of the activation area upon the proximity sensor detecting an object within the activation area, and a liftgate controller. The liftgate controller is to determine, based on the image, whether the object is a leg of a user and actuate the liftgate responsive to determining that the object is the leg.

An example disclosed method for initiating vehicle liftgate actuation includes monitoring, via a proximity sensor, an activation area of a liftgate of a vehicle and capturing an image of the activation area, via a camera, upon the proximity sensor detecting an object within the activation area. The example disclosed method also includes determining, via a processor, whether the object is a leg of a user and actuating the liftgate responsive to determining that the object is the leg.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, vehicles include doors and/or panels to enable users (e.g., occupants) to access interior areas of the vehicles. Oftentimes, a vehicle include side doors (e.g., a driver door, a front passenger seat, a rear driver-side door, a rear passenger-side door) to enable a driver and/or passenger(s) to enter and/or exit from a vehicle cabin. In some instances, a vehicle includes a liftgate that enable user(s) to access a trunk and/or other cargo area of the vehicle.

As used herein, a "liftgate" refers to a door or panel at a rear of a vehicle that opens upwardly to provide access to a trunk and/or another cargo area or compartment of the vehicle. In some examples, the liftgate includes a hatch that is coupled to a body of the vehicle (e.g., a sports-utility vehicle (SUV), a minivan, a hatchback. etc.) via a hinge located along an upper edge of a cargo area or compartment. In other examples, the liftgate includes a trunk lid that is coupled to a body of the vehicle (e.g., a sedan, a compact car, etc.) via a hinge along an outer edge of a trunk.

Recently, some vehicles include hands-free liftgate systems that enable a user to initiate opening and/or closing of a liftgate without use of his or her hands. Some hands-free liftgate systems include a sensor located near the liftgate of the vehicle and actuate the liftgate upon the sensor detecting that an object is located near the liftgate. In some such instances, the vehicle includes a hitch (e.g., for towing a trailer) located near the sensor of the hands-free liftgate system that may be detected by the sensor and subsequently cause the hands-free liftgate system to actuate the liftgate.

Example methods and apparatus disclosed herein identify an object positioned within an activation area of a hands-free liftgate system prior to initiating hands-free actuation of a liftgate to prevent a vehicle hitch, a trailer, an animal, and/or any other object located within the activation area from unintentionally causing the liftgate to open or close. Examples disclosed herein includes a hands-free liftgate system of a vehicle. The system includes a communication module to detect when a key fob or a phone-as-a-key associated with the vehicle is next to the liftgate. Upon detecting the key fob or phone-as-a-key, one or more proximity sensors (e.g., one or more capacitive sensors and/or ultrasonic sensors) detect whether an object is located in a predetermined area adjacent to the liftgate for triggering actuation of the liftgate. In response to the one or more proximity sensors detecting that there is an object located in the predetermined area, a camera captures an image of the predetermined area adjacent to the liftgate. A liftgate controller analyzes the image to determine whether a user is at least partially positioned within the predetermined area. If the liftgate controller determines that a user is crouched within the predetermined area (e.g., to connect a trailer to a hitch of the vehicle), the liftgate controller prevents the hands-free liftgate system from actuating the liftgate.

If the liftgate controller determines that the user is extending at least a portion of his or her leg (e.g., a foot) within the predetermined area, the liftgate controller actuates the liftgate. For example, the liftgate controller opens the liftgate if a liftgate sensor of the hands-free liftgate system detects that the liftgate is closed. The liftgate controller may close the liftgate if the liftgate sensor detects that the liftgate is opened. In other examples, the liftgate controller does not actuate the liftgate if the liftgate is opened. Further, in some examples, the hands-free liftgate system may adjust time and magnitude thresholds applied to the proximity sensors for activating actuation of the liftgate if the liftgate controller determines, based on the image captured by the camera, that a trailer is connected to the vehicle.

Figure 1:
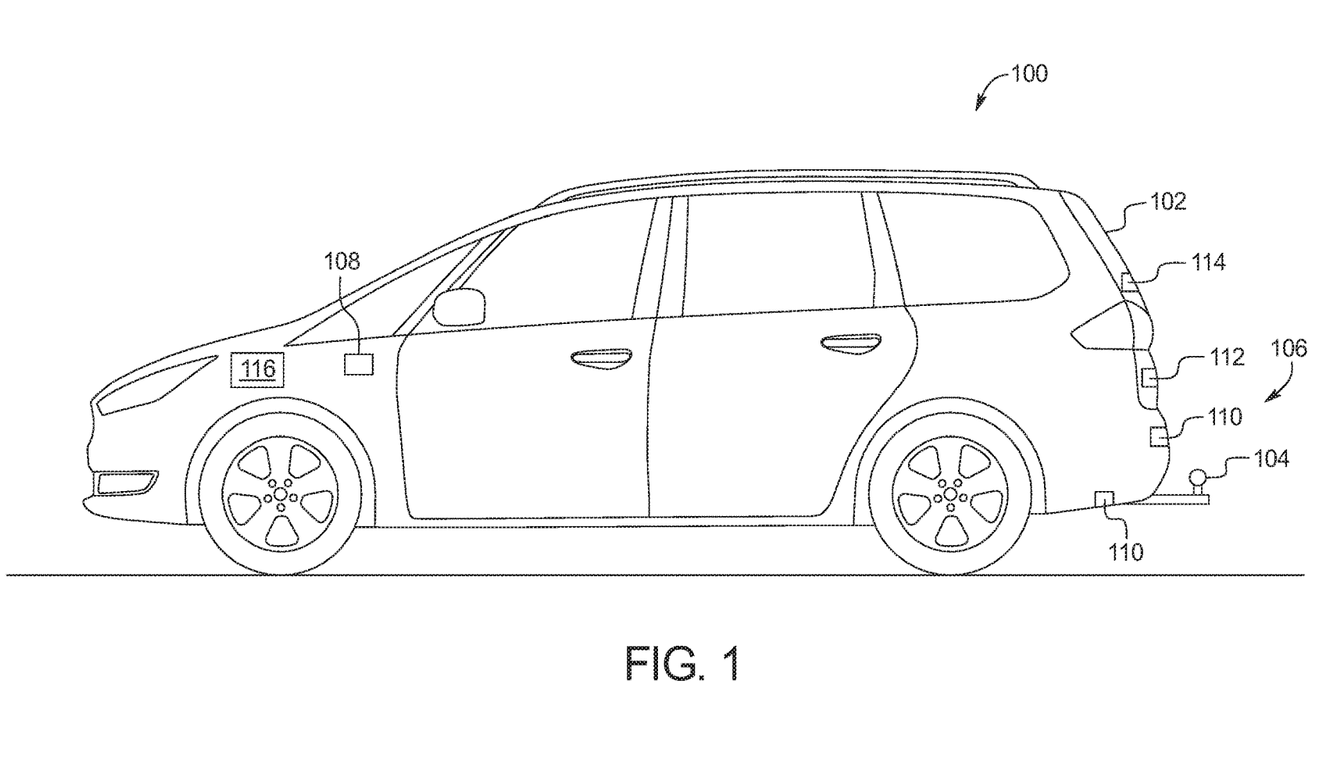
FIG. 1 illustrates an example vehicle including a liftgate in accordance with the teachings herein.

Turning to the figures, FIG. 1 illustrates an example vehicle 100 including a liftgate 102 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes the liftgate 102, a hitch 104, and a hands-free liftgate system 106. The liftgate 102 is a door or panel that opens upwardly to provide access to a cargo compartment located at a rear of the vehicle 100. The hitch 104 (e.g., a tow hitch, a tow bar, a trailer hitch, etc.) is located towards the rear of the vehicle 100 below the liftgate 102. For example, the hitch 104 is coupled to and/or extends from a chassis of the vehicle 100. The hitch 104 is configured to receive a coupling mechanism of a trailer (e.g., a trailer 402 of FIGS. 4-5) to couple the trailer to the vehicle 100. The vehicle 100 is able to tow the trailer when the trailer is coupled to the vehicle 100 via the hitch 104. Further, the hands-free liftgate system 106 enables a user (e.g., a user 302 of FIGS. 3-4) of the vehicle 100 to open the liftgate 102 without utilizing his or her hands. The hands-free liftgate system 106 of the illustrated example includes a communication module 108, a plurality of proximity sensors 110 (e.g., one or more capacitive sensors, one or more ultrasonic sensor, etc.), a camera 112, a liftgate sensor 114, and a liftgate controller 116.

The communication module 108 is, for example, a short-range wireless module for wireless communication with mobile device(s) and/or mobile device(s) of user(s) of the vehicle 100. In the illustrated example, the communication module 108 is communicatively connected to a key fob (e.g., a key fob 304 of FIG. 3) of a user (e.g., a user 302 of FIG. 3) of the vehicle 100. The communication module 108 includes hardware and firmware to establish a connection with the key fob. In some examples, the communication module 108 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally or alternatively, the communication module 108 may use WiFi, WiMax, NFC, UWB (Ultra-Wide Band) and/or any other communication protocol that enables communicative coupling with the key fob.

The proximity sensors 110 are to detect when an object is nearby by measuring a change in capacitance that is caused by the presence of the object. The proximity sensors 110 of the illustrated example are positioned on the vehicle 100 adjacent to the liftgate 102 to monitor an activation area (e.g., an activation area 202 of FIG. 2) of the liftgate 102 that is adjacent to the liftgate 102. For example, when the user extends at least a portion of his or her leg (e.g., a foot) into the activation area, one or more of the proximity sensors 110 detect the presence of the leg of the user. In the illustrated example, the proximity sensors 110 of the illustrated example are oriented downward toward the ground surface such that the proximity sensors 110 are able to detect objects that are located between the proximity sensors 110 and the ground surface.

The camera 112 of the vehicle 100 capture image(s) and/or video of the activation area that is adjacent to the liftgate 102. For example, the camera 112 is positioned toward the rear of the vehicle to enable the camera 112 to capture the image(s) and/or video of the activation area. In some examples, the camera 112 is coupled to the liftgate 102 to enable the camera 112 to capture the image(s) and/or video of the activation area when the liftgate 102 is closed.

Figure 2:
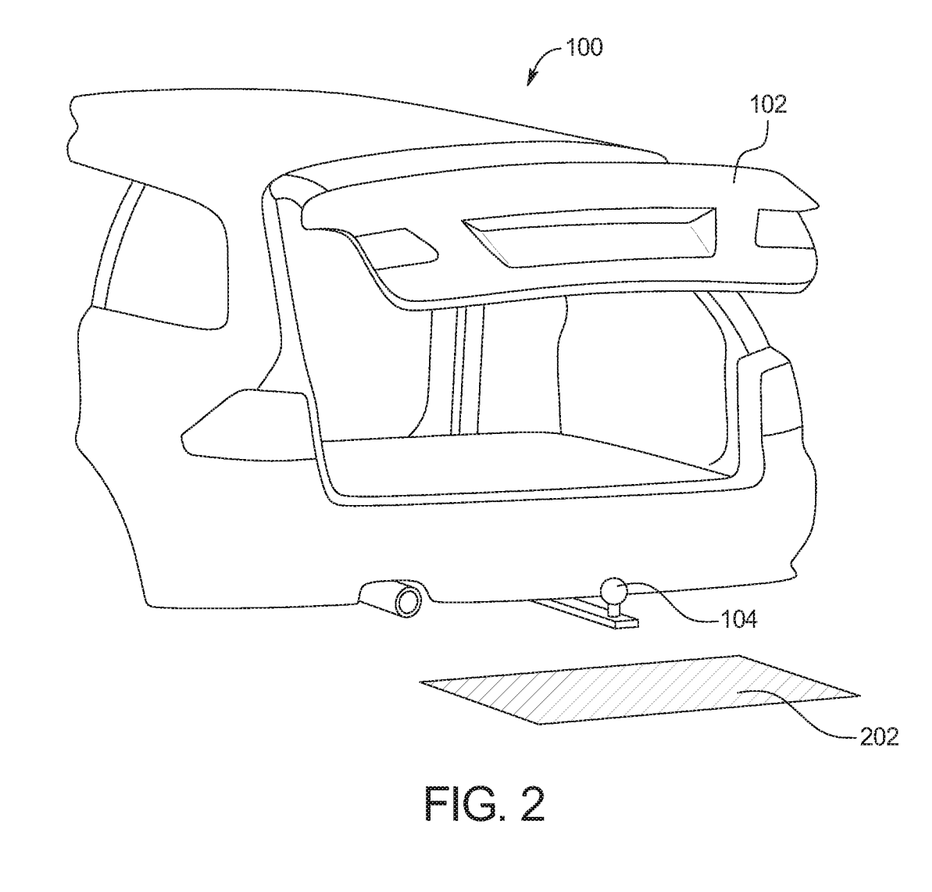
FIG. 2 illustrates the liftgate of FIG. 1 in an open position.

The liftgate sensor 114 detects a position of the liftgate 102 relative to a body of the vehicle 100. That is, the liftgate sensor 114 detects whether the liftgate 102 is in a closed position (as depicted in FIG. 1) or in an open position (as depicted in FIG. 2). As illustrated in FIG. 1, the liftgate sensor 114 is adjacent and/or coupled to the liftgate sensor 114 to monitor the position of the liftgate 102 relative to the body of the vehicle 100.

The liftgate controller 116 of the illustrated example determines when the user has positioned at least a portion of his or her leg (e.g., a foot) within the activation area to initiate opening or closing of the liftgate 102. Additionally, the liftgate controller causes the liftgate 102 to open and/or close upon determining that the user has extended his or her leg into the activation area.

In operation, the communication module 108 detects when the key fob carried by the user is approaching near and/or otherwise nearby the vehicle 100. When the communication module 108 detects that the key fob is nearby, one or more of the proximity sensors 110 are activated to monitor the activation area of the liftgate 102. Upon one or more of the proximity sensors 110 detect that an object is within the activation area, the camera 112 is utilized to capture image(s) and/or video of the activation area. For example, the camera 112 is activated responsive to one or more of the proximity sensors 110 detecting an object within the activation area. Subsequently, the liftgate controller 116 determines whether the object is at least a portion of a leg (e.g., a foot) of the user based upon the image(s) and/or video captured by the camera 112. For example, the liftgate controller 116 utilizes image-recognition software to identify the object that is located within the activation area. Further, the liftgate controller 116 actuates the liftgate 102 responsive to determining that the object is a leg. For example, upon the liftgate controller 116 determining that the object is a leg, the liftgate sensor 114 detects a position of the liftgate 102. If the liftgate sensor 114 detects that the liftgate 102 is closed, the liftgate controller 116 opens the liftgate 102. Further, in some examples, the liftgate controller 116 closes the liftgate 102 if the liftgate sensor 114 detects that the liftgate 102 is opened. In other examples, the liftgate controller 116 prevents the hands-free liftgate system 106 from actuating the liftgate 102 if the liftgate 102 is opened.

FIG. 2 depicts the liftgate 102 of the vehicle 100 in an open position. Further, FIG. 2 illustrates an activation area 202 that is located below the liftgate 102. The activation area 202 is utilized by a user (e.g., a user 302 of FIG. 3) of the vehicle 100 to cause the liftgate 102 to actuate. For example, the user extends at least a portion of his or her leg (e.g., a foot) into the activation area 202 for a predetermined period of time to cause the liftgate controller 116 of the hands-free liftgate system 106 to open and/or close the liftgate 102. In the illustrated example, the activation area 202 is defined, at least in part, by the proximity sensors 110 that are utilized to detect the leg of the user. For example, a shape and/or a size (e.g., a length, a height, and/or a depth) of the activation area 202 is defined, at least in part, by a detection range of each of the proximity sensors. Further, the proximity sensors 110 are oriented downward toward the ground surface such that the activation area 202 is located between the proximity sensors 110 and the ground surface. As illustrated in FIG. 2, the hitch 104 of the vehicle 100 extends into and/or nearby the activation area 202 that is utilized for activating actuation of the liftgate 102. As disclosed below in further detail below, the hands-free liftgate system 106 prevents the hitch 104 and/or other objects positioned near the hitch 104 within the activation area 202 from unintentionally activating actuation of the liftgate 102.

Figure 3:
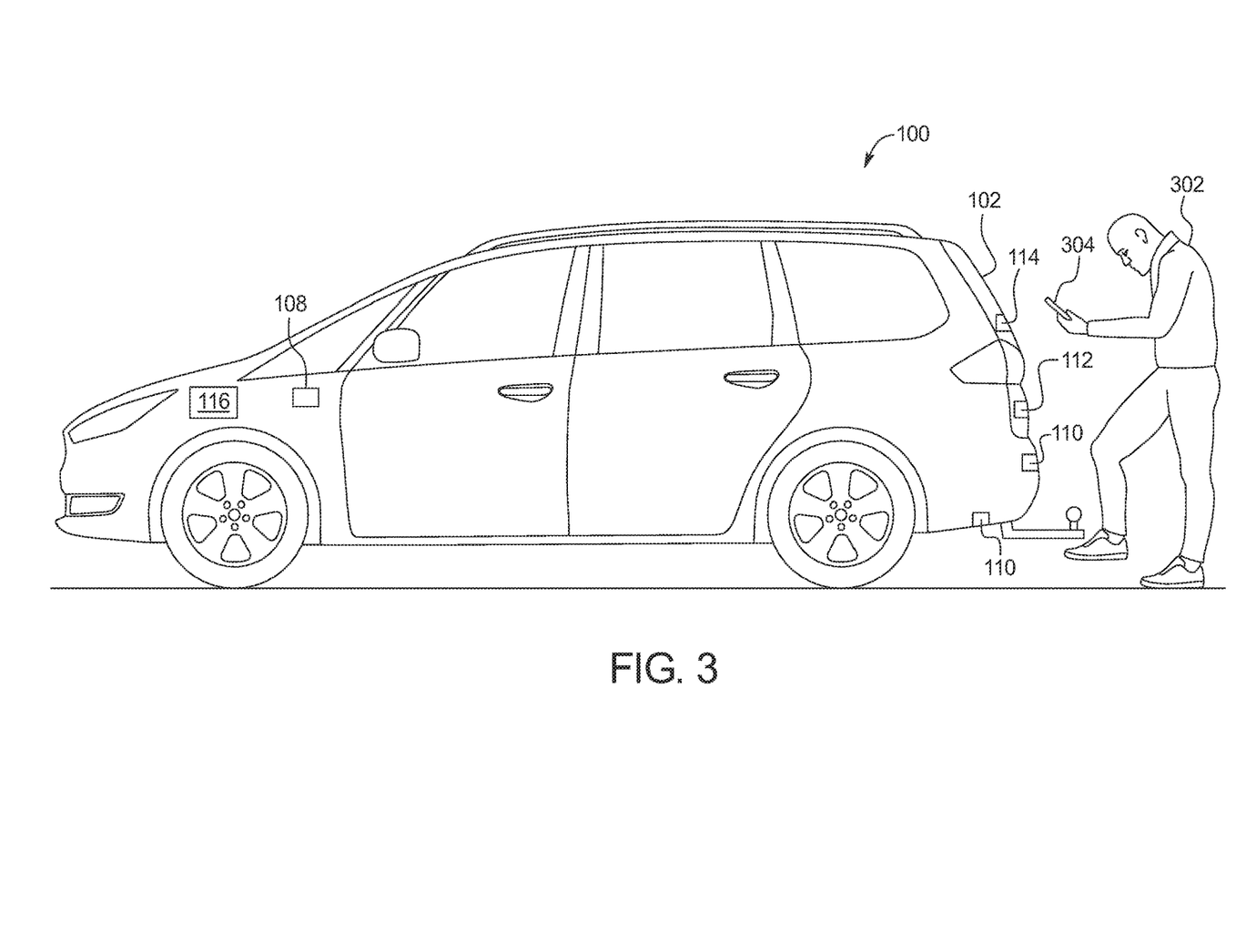
FIG. 3 illustrates a user initiating opening of the liftgate of FIG. 1.

FIG. 3 illustrates a user 302 (e.g., a driver, a passenger) initiating opening of the liftgate 102 via the hands-free liftgate system 106. As illustrated in FIG. 3, the user 302 is carrying a key fob 304 that corresponds to the vehicle 100. The key fob 304 includes a wireless transceiver that communicates with the communication module 108 to initiate one or more functions (e.g., unlocking a driver door, activating an engine) of the vehicle 100. In other examples, the user 302 carries a mobile device (e.g., a smart phone, a wearable, a smart watch, a tablet, etc.) that includes a wireless transceiver and functions as a phone-as-a-key (PaaK) for the vehicle 100 by communicating with the communication module 108 to initiate one or more functions of the vehicle 100. For example, a mobile device operating as a phone-as-a-key includes an application that enables the mobile device to initiate one or more functions of the vehicle 100.

In the illustrated example, prior to the key fob 304 communicatively coupling to the communication module 108 of the vehicle 100, the communication module 108 authenticates the key fob 304 for communication with the communication module 108. To authenticate the key fob 304, the communication module 108 intermittently broadcasts a beacon (e.g., a low-energy beacon such as Bluetooth® low-energy (BLE) beacon). When the key fob 304 is within a broadcast range of the communication module 108, the key fob 304 receives the beacon and subsequently sends a key. The communication module 108 authenticates the key fob 304 for communication upon receiving the key from the key fob 304. In other examples, the key fob 304 broadcasts a beacon and the communication module 108 subsequently receives the beacon to authenticate communication between the key fob 304 and the communication module 108.

Further, after the communication module 108 detects and establishes communication with the key fob 304, the proximity sensors 110 monitor the activation area 202 of the liftgate 102. In the illustrated example, the user 302 extends a portion of his or her leg into the activation area 202. To prevent the hitch 104, an object coupled to the hitch 104, and/or any other object from unintentionally initiating actuation of the liftgate 102, the camera 112 is utilized to capture image(s) and/or video of the activation area 202 upon one or more of the proximity sensors 110 detecting an object within the activation area 202.

In FIG. 3, the liftgate controller 116 confirms that the object detected within the activation area 202 is the leg of the user 302 based on the image(s) and/or video captured by the camera 112. After the liftgate controller 116 determines that the object is a leg of the user 302, the liftgate sensor 114 detects that the liftgate 102 of the illustrated example is in a closed position. Subsequently, the liftgate controller 116 opens the liftgate 102. In some examples, the liftgate controller 116 opens and/or otherwise actuates the liftgate 102 upon determining that the user 302 has extended his or her leg into the activation area 202 for at least a predetermined threshold to prevent the user 302 from unintentionally activating the liftgate 102 when standing and/or walking near the rear of the vehicle 100. Further, in some instances, the liftgate controller 116 determines that the leg of the user 302, as well as another object (e.g., the hitch 104, an object coupled to the hitch 104, an animal, etc.), is located within the activation area 202 of the liftgate 102. In such instances, the liftgate controller 116 causes the liftgate 102 to actuate upon identifying that one of the objects detected within the activation area 202 is the leg of the user 302.

Figure 4:
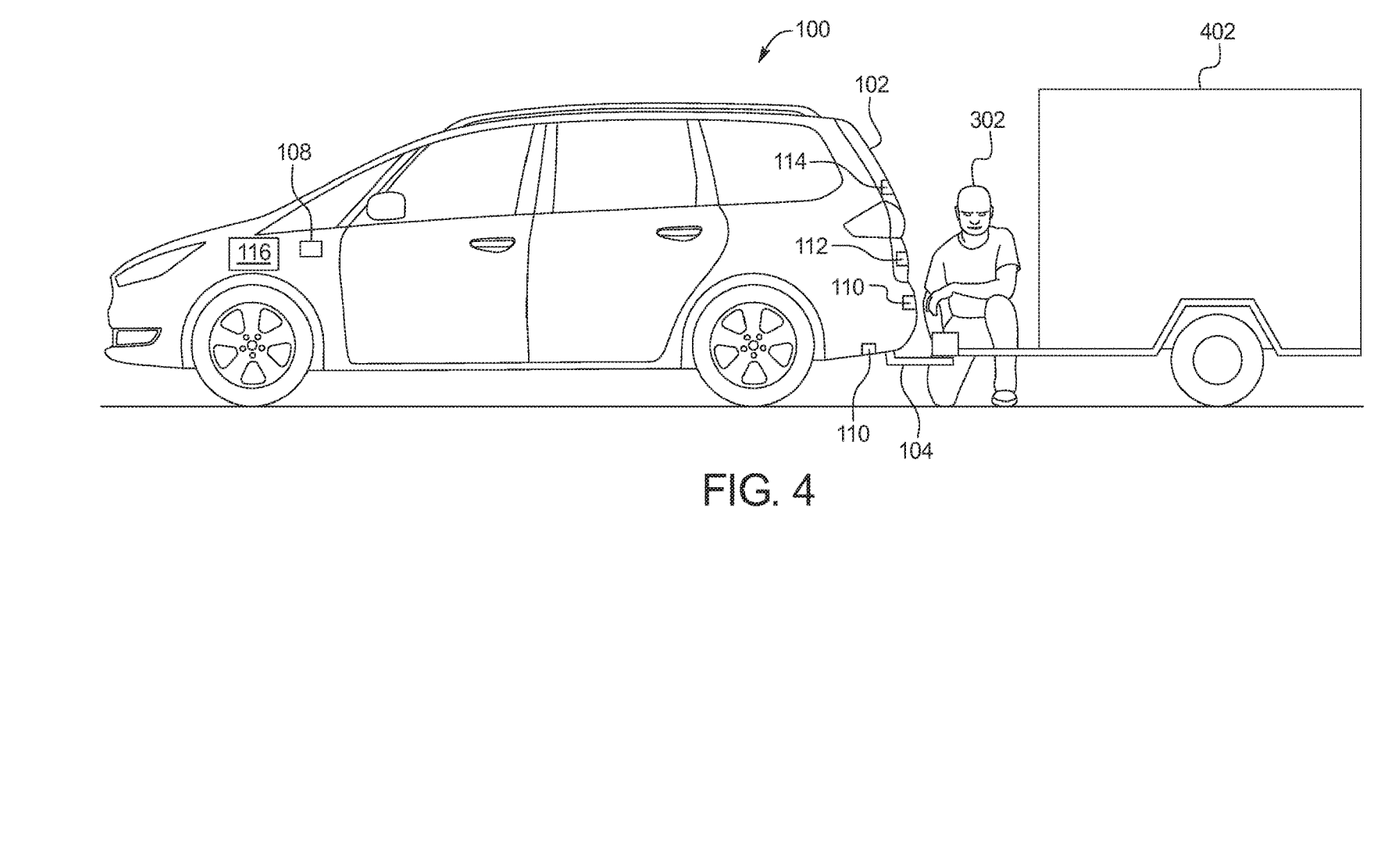
FIG. 4 illustrates the user of FIG. 3 coupling a trailer to a hitch of the vehicle of FIG. 1.

FIG. 4 illustrates the user 302 coupling a trailer 402 to the hitch 104 of the vehicle 100. The user 302 is crouched down near and/or at least partially within the activation area 202 when coupling the trailer 402 to the hitch 104. In the illustrated example, the user 302 is carrying the key fob 304. After the communication module 108 detects that the key fob 304 is near the vehicle 100, the proximity sensors 110 monitor the activation area 202 of the liftgate 102. When the user 302 is crouching down into the activation area 202, one or more of the proximity sensors 110 detect that an object is located within the activation area 202. After the one or more of the proximity sensors 110 of the illustrated example detect that an object is within the activation area 202, the camera 112 captures image(s) and/or video of the activation area 202 to enable the liftgate controller 116 to identify the object(s) located within the activation area 202.

In the illustrated example, the liftgate controller 116 determines that the user 302 is crouched within the activation area 202 based upon the captured image(s) and/or video. Upon determining that the user 302 is crouched within the activation area 202, the liftgate controller 116 prevents hands-free actuation of the liftgate 102 to prevent the liftgate 102 from being unintentionally opened or closed while the user 302 is coupling the trailer 402 to the hitch 104 of the vehicle 100. That is, upon the liftgate controller 116 determining that no object within the activation area 202 is an extended leg of the user 302, the liftgate controller 116 prevents the hands-free liftgate system 106 from actuating the liftgate 102.

Figure 5:
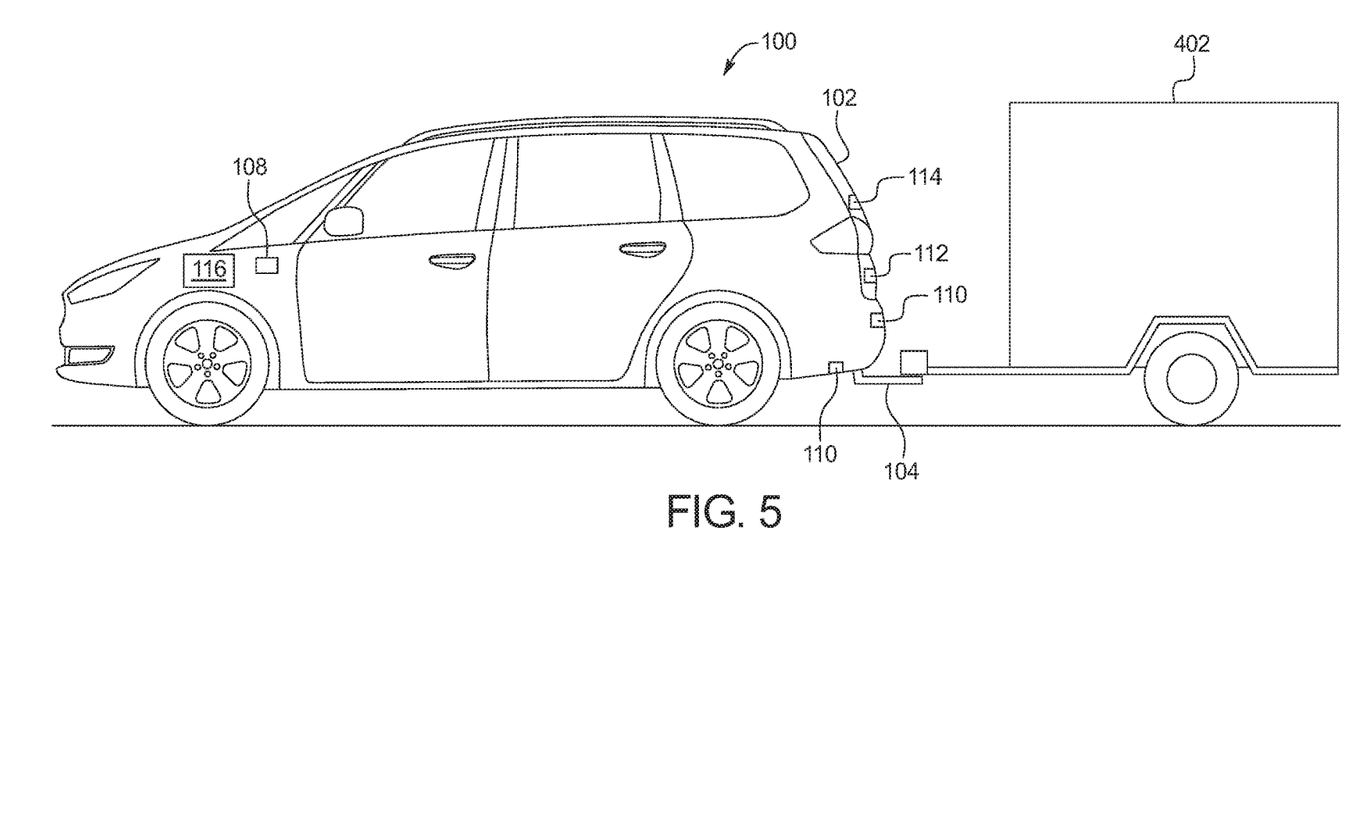
FIG. 5 illustrates the trailer of FIG. 4 coupled to the hitch of the vehicle of FIG. 1.

FIG. 5 illustrates the trailer 402 coupled to the hitch 104 of the vehicle 100. In the illustrated example, the proximity sensors 110 monitor the activation area 202 of the liftgate 102 if the communication module 108 detects that the key fob 304 is near the vehicle 100. In some instances, the trailer 402, the hitch 104, another object hanging from the hitch 104, and/or any other object may extend into the activation area 202 when the user 302 is not located near the liftgate 102 of the vehicle 100. After one or more of the proximity sensors 110 detects an object within the activation area 202, the camera 112 captures image(s) and/or video of the activation area 202 to enable the liftgate controller 116 to identify the object(s) located within the activation area 202.

In the illustrated example, the liftgate controller 116 identifies that no object extending into and/or otherwise located within the activation area 202 is the user 302. For example, the liftgate controller 116 identifies that the object within the activation area 202 is the hitch 104 and/or the trailer 402. The liftgate controller 116 prevents the hands-free liftgate system 106 from actuating the liftgate 102 upon the liftgate controller 116 determining that no object within the activation area 202 is the user 302. That is, the liftgate controller 116 prevents the hands-free liftgate system 106 from opening or closing when the liftgate controller 116 identifies other objects, but no extended leg of the user 302, within the activation area 202.

In some examples, the liftgate controller 116 detects when the trailer 402 is coupled to the hitch 104 of the vehicle 100. For example, the liftgate controller 116 identifies that the trailer 402 is coupled to the hitch 104 via sensor(s) of the hitch 104 and/or based on the image(s) and/or video captured by the camera 112. When the liftgate controller 116 detects that the trailer 402 is not coupled to the hitch 104, the liftgate controller 116 actuates the liftgate 102 upon determining that the user 302 has extended his or her leg into the activation area 202 for a first predetermined threshold. When the liftgate controller 116 detects that the trailer 402 is coupled to the hitch 104, the liftgate controller 116 actuates the liftgate 102 upon determining that the user 302 has extended his or her leg into the activation area 202 for a second predetermined threshold. For example, the second predetermined threshold is greater than the first predetermined threshold to further prevent the trailer 402 from causing unintentional actuation of the liftgate 102.

Figure 6:
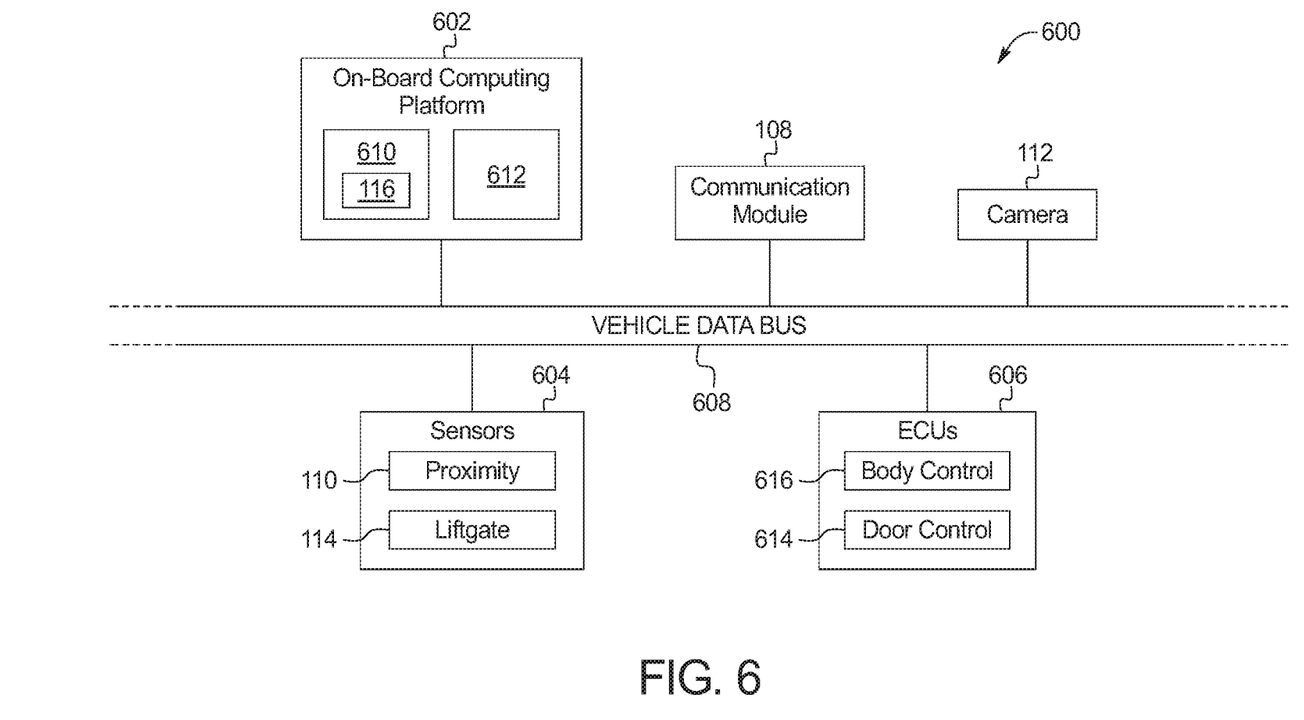
FIG. 6 is a block diagram of electronic components of the vehicle of FIG. 1.

FIG. 6 is a block diagram of electronic components 600 of the vehicle 100. As illustrated in FIG. 6, the electronic components 600 include an on-board computing platform 602, the camera 112, the communication module 108, sensors 604, electronic control units (ECUs) 606, and a vehicle data bus 608.

The on-board computing platform 602 includes a microcontroller unit, controller or processor 610 and memory 612. In some examples, the processor 610 of the on-board computing platform 602 is structured to include the liftgate controller 116. Alternatively, in some examples, the liftgate controller 116 is incorporated into another electronic control unit (ECU) with its own processor and memory. The processor 610 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 612 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 612 includes multiple kinds of memory, particularly volatile memory and non-volatile memory.

The memory 612 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 612, the computer readable medium, and/or within the processor 610 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 604 are arranged in and around the vehicle 100 to monitor properties of the vehicle 100 and/or an environment in which the vehicle 100 is located. One or more of the sensors 604 may be mounted to measure properties around an exterior of the vehicle 100. Additionally or alternatively, one or more of the sensors 604 may be mounted inside a cabin of the vehicle 100 or in a body of the vehicle 100 (e.g., an engine compartment, wheel wells, etc.) to measure properties in an interior of the vehicle 100. For example, the sensors 604 include accelerometers, odometers, tachometers, pitch and yaw sensors, wheel speed sensors, microphones, tire pressure sensors, biometric sensors and/or sensors of any other suitable type. In the illustrated example, the sensors 604 include the proximity sensors 110 and the liftgate sensor 114.

The ECUs 606 monitor and control the subsystems of the vehicle 100. For example, the ECUs 606 are discrete sets of electronics that include their own circuit(s) (e.g., integrated circuits, microprocessors, memory, storage, etc.) and firmware, sensors, actuators, and/or mounting hardware. The ECUs 606 communicate and exchange information via a vehicle data bus (e.g., the vehicle data bus 608). Additionally, the ECUs 606 may communicate properties (e.g., status of the ECUs 606, sensor readings, control state, error and diagnostic codes, etc.) to and/or receive requests from each other. For example, the vehicle 100 may have seventy or more of the ECUs 606 that are positioned in various locations around the vehicle 100 and are communicatively coupled by the vehicle data bus 608.

In the illustrated example, the ECUs 606 include a door control unit 614 and a body control module 616. For example, the door control unit 614 is utilized to monitor and control electronic components and/or systems of a door (e.g., the liftgate 102) of the vehicle 100. The body control module 616 controls one or more subsystems throughout the vehicle 100 (e.g., an immobilizer system, etc). For example, the body control module 616 includes circuits that drive one or more of relays (e.g., to control wiper fluid, etc.), brushed direct current (DC) motors (e.g., to control power seats, wipers, etc.), stepper motors, LEDs, etc.

The vehicle data bus 608 communicatively couples the communication module 108, the camera 112, the on-board computing platform 602, the sensors 604, and the ECUs 606. In some examples, the vehicle data bus 608 includes one or more data buses. The vehicle data bus 608 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 7:
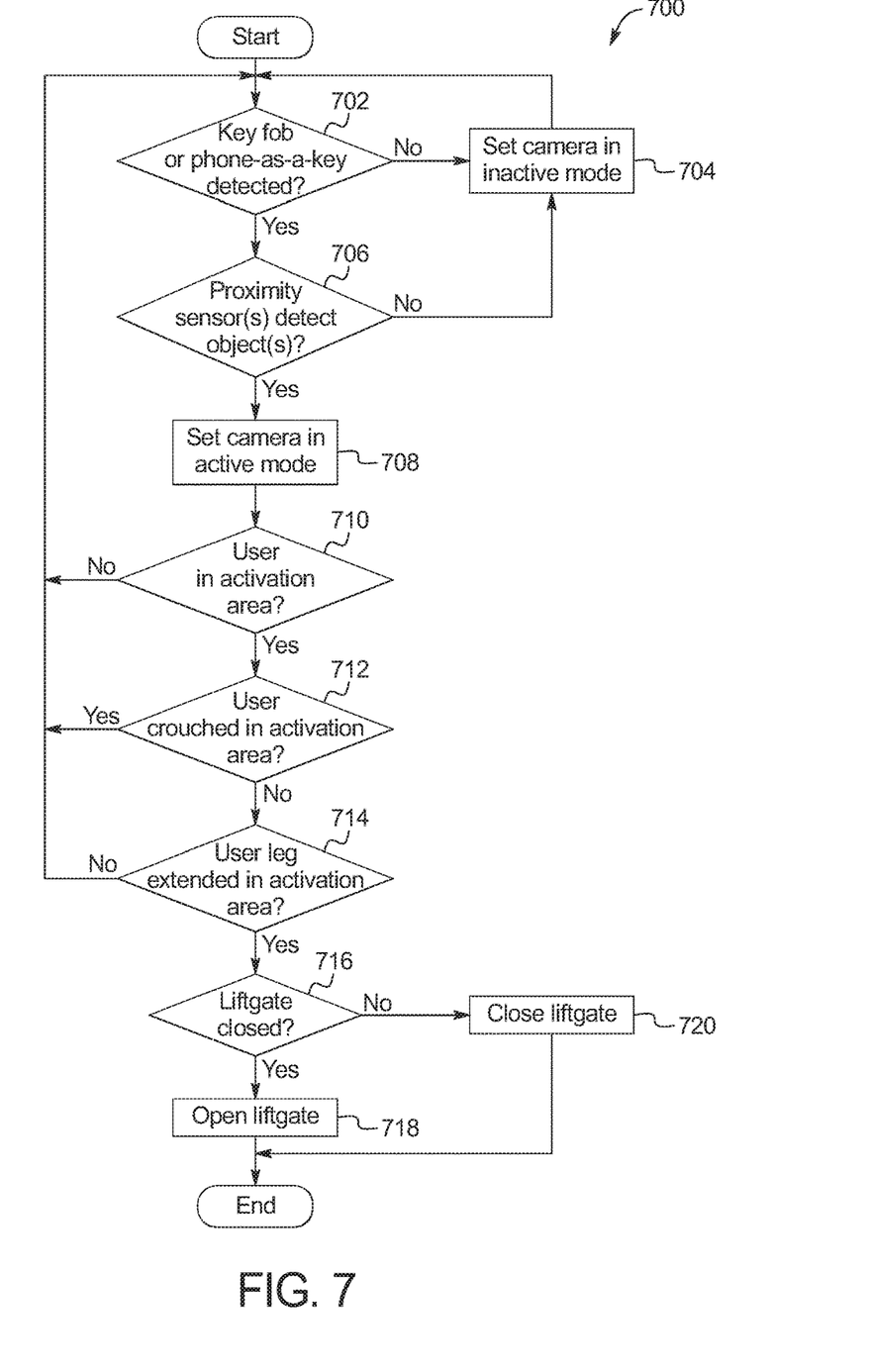
FIG. 7 is a flowchart for initiating actuation of the liftgate of the vehicle of FIG. 1 in accordance with the teachings herein.

FIG. 7 is a flowchart of an example method 700 to initiate actuation of a liftgate of a vehicle via a hands-free liftgate system in accordance with the teachings herein. The flowchart of FIG. 7 is representative of machine readable instructions that are stored in memory (such as the memory 612 of FIG. 6) and include one or more programs which, when executed by a processor (such as the processor 610 of FIG. 6), cause the vehicle 100 to implement the example liftgate controller 116 of FIGS. 1 and 6. While the example program is described with reference to the flowchart illustrated in FIG. 7, many other methods of implementing the example liftgate controller 116 may alternatively be used. For example, the order of execution of the blocks may be rearranged, changed, eliminated, and/or combined to perform the method 700. Further, because the method 700 is disclosed in connection with the components of FIGS. 1-6, some functions of those components will not be described in detail below.

Initially, at block 702, the liftgate controller 116 determines whether the key fob 304 and/or a phone-as-a-key corresponding to the vehicle is detected to be nearby the vehicle 100. For example, the communication module 108 detects whether the key fob 304 is near the vehicle 100. In response to the communication module 108 not detecting the key fob 304, the method 700 proceeds to block 704 at which the liftgate controller 116 sets the camera 112 in an inactive mode for the hands-free liftgate system 106. Otherwise, in response to the communication module 108 not detecting the key fob 304, the method 700 proceeds to block 706. In some examples, the liftgate controller 116 activates the proximity sensors 110 (e.g., one or more capacitive sensors and/or ultrasonic sensors) prior to proceeding to block 706.

At block 706, the liftgate controller 116 determines whether the proximity sensors 110 detect object(s) within the activation area 202 of the hands-free liftgate system 106. In response to the proximity sensors 110 not detecting an object within the activation area 202, the method 700 proceeds to block 704 at which the liftgate controller 116 sets the camera 112 in the inactive mode for the hands-free liftgate system 106. Otherwise, in response to the proximity sensors 110 detecting an object within the activation area 202, the method 700 proceeds to block 708 at which the liftgate controller 116 sets the camera 112 in an active mode for the hands-free liftgate system 106. When the camera 112 is in the active mode, the camera 112 captures image(s) and/or video of the activation area 202 of the liftgate 102.

At block 710, the liftgate controller 116 determines whether the user 302 is at least partially positioned in the activation area 202. In response to the liftgate controller 116 determining that the user 302 is not at least partially positioned in the activation area 202, the method 700 returns to block 702. Otherwise, in response to the liftgate controller 116 determining that the user 302 is not at least partially positioned in the activation area 202, the method 700 proceeds to block 712.

At block 712, the liftgate controller 116 determines whether the user 302 is crouched down (e.g., to couple the trailer 402 to the hitch 104) within the activation area 202. In response to the liftgate controller 116 determining that the user 302 is crouched down into the activation area 202, the method 700 returns to block 702. Otherwise, in response to the liftgate controller 116 determining that the user 302 is not crouched down into the activation area 202, the method 700 proceeds to block 714.

At block 714, the liftgate controller 116 determines whether a leg of the user 302 is extended into the activation area 202. In response to the liftgate controller 116 determining that a leg of the user 302 is not extended into the activation area 202, the method 700 returns to block 702. Otherwise, in response to the liftgate controller 116 determining that a leg of the user 302 is extended into the activation area 202, the method 700 proceeds to block 716.

At block 716, the liftgate controller 116 determines whether the liftgate 102 is closed. For example, the liftgate sensor 114 detects whether the liftgate is closed or opened. In response to liftgate controller 116 determining that the liftgate 102 is closed, the method 700 proceeds to block 718 at which the liftgate controller 116 opens the liftgate 102. Otherwise, in response to liftgate controller 116 determining that the liftgate 102 is not closed (i.e., opened), the method proceeds to block 720 at which the liftgate controller 116 closes the liftgate 102. In other examples, the liftgate controller 116 prevents hands-free actuation of the liftgate 102 upon determining that the liftgate 102 is opened.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a liftgate;
    a proximity sensor for monitoring an activation area of the liftgate;
    a camera to capture an image of the activation area upon the proximity sensor detecting an object within the activation area; and
    a liftgate controller to:
        determine, based on the image, whether the object is a leg of a user; and
        actuate the liftgate responsive to determining that the object is the leg.

2. The vehicle of claim 1, further including a short-range wireless module for detecting when a key fob of the user is nearby.

3. The vehicle of claim 2, wherein the proximity sensor is to activate responsive to the short-range wireless module detecting that the key fob is nearby.

4. The vehicle of claim 1, wherein the camera is to activate responsive to the proximity sensor detecting that the object is within the activation area.

5. The vehicle of claim 1, further including a plurality of proximity sensors for monitoring the activation area, the plurality of proximity sensors including the proximity sensor.

6. The vehicle of claim 1, wherein the liftgate controller is to:
determine, based on the image, whether the user is at least partially within the activation area; and
prevent hands-free actuation of the liftgate responsive to determining that the user is not at least partially within the activation area.

7. The vehicle of claim 1, wherein the liftgate controller is to:
determine, based on the image, whether the user is crouched within the activation area; and
prevent hands-free actuation of the liftgate responsive to determining that the user is crouched within the activation area.

8. The vehicle of claim 1, further including a liftgate sensor for detecting a position of the liftgate.

9. The vehicle of claim 8, wherein the liftgate controller opens the liftgate responsive to:
the liftgate controller determining that the object is the leg; and
the liftgate sensor detecting that the liftgate is closed.

10. The vehicle of claim 8, wherein the liftgate controller closes the liftgate responsive to the liftgate controller determining that the object is the leg and the liftgate sensor detecting that the liftgate is opened.

11. The vehicle of claim 1, wherein the liftgate controller determines, based on the image captured by the camera, whether a trailer is coupled to a hitch adjacent to the liftgate.

12. The vehicle of claim 11, wherein the liftgate controller actuates the liftgate upon determining that the leg of the user has been positioned within the activation area for at least a predetermined time threshold, the predetermined time threshold being a first predetermined threshold if the trailer is not coupled to the hitch, the predetermined threshold being a second predetermined threshold if the trailer is coupled to the hitch, the second predetermined threshold being greater than the first predetermined threshold.

13. A method for initiating vehicle liftgate actuation comprising:
monitoring, via a proximity sensor, an activation area of a liftgate of a vehicle;
capturing an image of the activation area, via a camera, upon the proximity sensor detecting an object within the activation area;
determining, via a processor, whether the object is a leg of a user; and
actuating the liftgate responsive to determining that the object is the leg.

14. The method of claim 13, further including:
detecting, via a short-range wireless module, when a key fob of the user is nearby; and
activating the proximity sensor responsive to the short-range wireless module detecting that the key fob is nearby.

15. The method of claim 13, further including activating the camera responsive to the proximity sensor detecting that the object is within the activation area.

16. The method of claim 13, further including:
determining, based on the image, whether the user is at least partially within the activation area; and
preventing hands-free actuation of the liftgate responsive to determining that the user is not at least partially within the activation area.

17. The method of claim 13, further including:
determining, based on the image, whether the user is crouched within the activation area; and
preventing hands-free actuation of the liftgate responsive to determining that the user is crouched within the activation area.

18. The method of claim 13, further including detecting a position of the liftgate via a liftgate sensor.

19. The method of claim 18, further including opening the liftgate responsive to:
determining that the object is the leg; and
detecting that the liftgate is closed.

20. The method of claim 13, further including actuating the liftgate upon determining that the leg of the user has been positioned within the activation area for at least a predetermined time threshold.

* * * * *